Sept. 21, 1943.                W. L. SMITH                 2,330,151
                            DISTRIBUTING VALVE
                        Filed Aug. 17, 1942          2 Sheets-Sheet 1
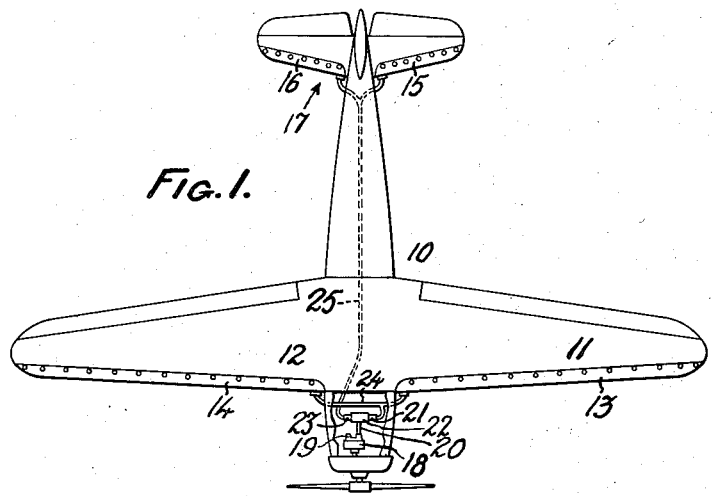
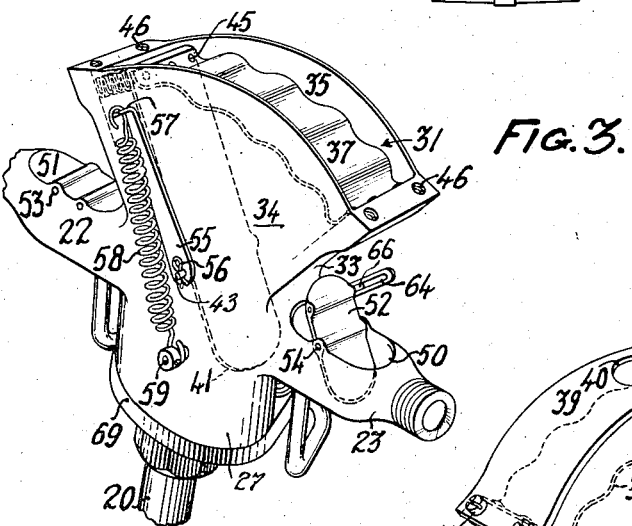
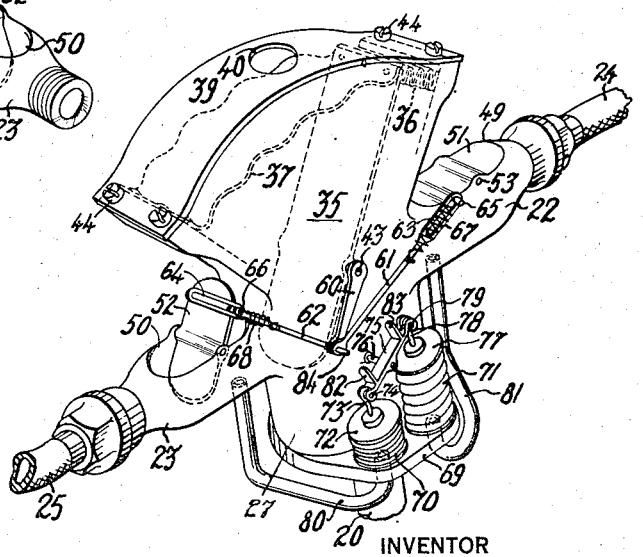
INVENTOR
WESLEY L. SMITH
BY
*David P. Moody*
ATTORNEY Sept. 21, 1943.                W. L. SMITH                    2,330,151
                          DISTRIBUTING VALVE
                          Filed Aug. 17, 1942           2 Sheets-Sheet 2
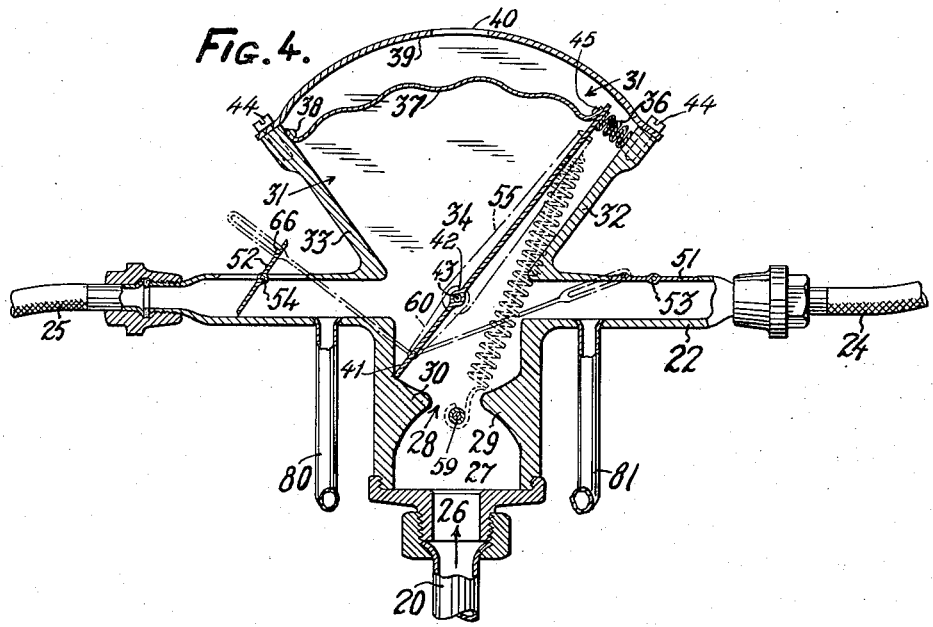
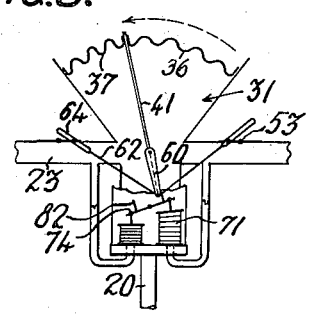
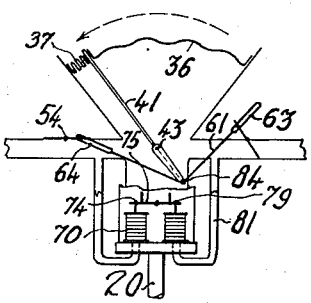
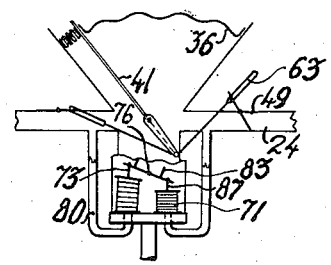
INVENTOR
    WESLEY L. SMITH
BY
    ATTORNEY

UNITED STATES PATENT OFFICE 2,330,151

DISTRIBUTING VALVE

Wesley L. Smith, Bedford, Va., assignor to Bendix Aviation Corporation, South Bend, Ind., a corporation of Delaware Application August 17, 1942, Serial No. 455,117

6 Claims. (Cl. 137—145)

This invention relates to fluid distributing systems and more particularly to a valve for distributing a fluid such as air.

Ice eliminating systems for aircraft have followed several trends of design in the mechanism for controlling the air flow to the inflatable rubber elements of an ice control system. A particular system is exemplified in the Gregg Patent 1,990,866, and the present invention is directed particularly to improvements in the air distributing mechanism for a system similar to that disclosed in the Gregg patent.

It is an object of the present invention to provide a fluid distributing valve wherein the fluid flow may be directed from an inlet to any of a plurality of fluid outlets in accordance with a cycle controlled by a predetermined differential of pressure between fluid outlets.

It is another object of the invention to provide a distributing valve including an oscillating vane member confined within a rigid chamber having a flexible end wall, wherein distribution of fluid is controlled by the movement of said vane member under control of a latching arrangement governed by the differential of pressure between two or more outlet branches of the system.

A further object of the invention includes the provision of a novel arrangement of an oscillatory vane member in combination with several outlet relief valves for controlling the distribution of fluid in accordance with the pressure differential between two outlet conduits.

Additional objects of the invention will become apparent from a consideration of the following specification along with the attached drawings, throughout which like reference numerals are used to designate like parts.

Fig. 1 is a plan view of an aircraft with parts broken away to show a typical installation of a fluid valve of the present invention.

Fig. 2 is a perspective of one form of valve of the present invention.

Fig. 3 is a perspective, from a different quarter, of the valve shown in Fig. 2.

Fig. 4 is a longitudinal sectional view of the valve member shown in Figs. 2 and 3.

Figs. 5, 6 and 7 are schematic representations of the same fluid distributing valve, showing the valve in different portions of a typical cycle of operation.

In an ice eliminating system utilizing inflatable boot elements as shown and described in the above-identified Gregg patent, the distributing mechanism is a motor-driven rotary valve which is continuously rotated through a definite cycle of operation. In accordance with the present invention, no external motor or engine is required to control the cyclic distribution of air to the different boot elements and the distribution is controlled wholly by determined pressure differential values between two outlet conduits of the distributing valve, and the distributing valve itself is operated directly by the pressure of the air or the other fluid being distributed.

In a typical installation of the valve of the present invention, Fig. 1 shows an aircraft 10 having wing members 11 and 12, the leading edges of which carry inflatable boot elements 13 and 14, respectively. Additional boot elements 15 and 16 are carried upon the leading edges of the tail section 17 of aircraft 10. Other boot elements may be applied if desired to other leading surfaces of the craft, although for an understanding of the present invention, a showing of further boot installation is unnecessary.

The aircraft engine drives a conventional air pump 18 having an inlet 19 and a conduit 20 which is connected between the outlet of pump 18 and the distributing valve member 21. Valve member 21 has two separate outlet conduits 22 and 23. Conduit 22 is connected by means of tubing or piping 24 to the boot members 13 and 14. Conduit 23 is connected by tubing or piping 25 to the boot members 15 and 16. Air will thus be distributed to the wing and tail surface boots in definite cycles. The particular network of air distribution is unimportant to a consideration of the present invention and need not be further discussed.

The details of structure of one embodiment of the present invention are set forth in Figs. 2, 3 and 4. Conduit 20, which is connected to the output of the air pump 18, is connected by means of a conventional screw threaded union to the inlet port 26, which communicates with an air inlet chamber 27. Chamber 27 communicates through a throat 28 (formed by the presence of the fillets 29 and 30 within chamber 27) with a large sector-shaped distribution chamber 31. This chamber has radially extending, rigid end walls 32 and 33, and flat side walls 34 and 35, which may be integral with walls 32 and 33 or secured thereto with a fluid-tight seal. Chamber 31 is closed at the top by means of flexible, and preferably metallic, ribbons 36 and 37, one end of each of which is attached to the end wall 32 or 33 by means of rivets or screw members 38. A protective metallic dome or cover 39 is attached by stud members 44 to the top of end walls 32 and 33 and has a large aperture 40 therein for exposing the flexible walls 36 and 37 to atmospheric pressure.

A flat piston or vane member 41 is pivoted at 42 to a shaft 43 extending transversely through the chamber 31 and extending to the outside of the housing of valve 21. Flexible wall members 36 and 37 are connected by rivets 45 to opposite faces of vane 41 at the top thereof. Vane member 41 extends downwardly to the curved tops of the fillets 29 and 30. The sliding fit between the edges of the vane 41 and the side walls 34 and 35 of the distributing valve is close, to minimize the leakage of air past the vane during operation thereof.

Outlet conduits 22 and 23 open into chamber 31 from opposite end walls 32 and 33. These conduits connect through conventional coupling members with the tubes or piping elements 24 and 25. Conduits 22 and 23 have valve apertures 49 and 50 and relief valves 51 and 52 pivoted at 53 and 54, so that apertures 50 and 51 may be opened to relieve air pressure in conduits 22 and 23 or closed to prevent loss of air through apertures 49 and 50 in the manner to be described later.

Shaft 43 carries two arm members exteriorly of the housing of valve 21. One of these arms 55, extends upwardly within the plane through which the surface of vane 41 would pass if projected. This arm is keyed to shaft 43 and may be secured by a cotter-pin 56 as shown. Arm 55 terminates at its upper end in an outwardly turned lip 57, having an aperture through which one end of a helical spring 58 is looped. The opposite end of spring 58 is hooked to a pin member 59, extending from the housing of valve 21 at a distance below the shaft 43 and in the vertical plane passing through shaft 43. Spring 58 is under continuous tension and it will be understood from an observation of Fig. 3 that vane member 41 will be normally urged toward either of end walls 32 and 33 by the action of spring 58, but that it will not be possible for vane 41 to stop at the dead-center or vertical position of its travel from one end of chamber 31 to the other.

The second arm 60, carried by shaft 43 on the opposite end thereof, is fixed to the shaft so that it will be turned therewith, and it will be noted that arm 60 extends downwardly and radially from shaft 43, in the plane of the surface of vane 41. Connecting rods 61 and 62 are pivotally attached to the outer end of arm 60. These connecting rods extend angularly out of arm 60 and have at their outer ends the respective elongated apertures or slots 63 and 64, in which ride pins 65 and 66, respectively, extending outwardly from the faces of relief valve members 51 and 52. Coiled springs 67 and 68 have one end anchored to the connecting rods 61 and 62, respectively, and their other ends anchored, under tension, to the respective pin members 65 and 66.

In the position shown best in Fig. 2, vane 41 is held, under tension of spring 58, at one end of compartment 31, namely the end closest to wall 32. In this position, arm 60 is at its extreme clockwise throw; thus pin 65 is carried at the outermost end of the slot 63. For this same angular position of arm 60, pin member 66 rests within the innermost end of slot 64. The lost motion introduced by these slots permits relief valve 51 to be held tightly closed and relief valve 52 to be held completely open.

It is understood, of course, that when relief valve 52 is open, as shown in Fig. 2, then air which had been under pressure within boots 15 and 16 will be vented to the atmosphere, and with valve 51 held tightly closed, then air within conduit 22 and boots 13 and 14 will be under pressure since there is direct communication between the input conduit 20 and outlet conduit 22 with vane 41 in the position shown.

When arm 60 has been oscillated to its position of extreme counter-clockwise motion, as viewed from Fig. 2, valve 52 will be closed and valve 51 will be opened. Due to the action of spring 68 when arm 60 begins its counter-clockwise motion, valve 52 will begin to close and when the arm has reached the limit of its counter-clockwise motion, the valve will be closed not only because of the tension of spring 68, but because slot 64 will have moved inwardly with respect to pin 66 until the pin is in the outermost end of slot 64. Valve 52 will therefore be held tightly closed by connecting rod 62. When counter-clockwise motion of arm 60 is begun, valve 51 will not open immediately, since the tension of spring 63 will hold pin 65 from oscillating until connecting rod 61 has been moved almost to the end of its travel by arm 60. Pin 65 will be thrust against the innermost edge of slot 64 and will cause valve 51 to quickly be pivoted to its open position. The same opening sequence of operations occurs upon clockwise motion of arm 60 with, however, valve 52 being considered instead of valve 51.

The housing of valve 21 carries an integral ledge or platform 69, which is shown best in Fig. 2. Upon this platform are secured the bottoms of two flexible metallic bellows 70 and 71. Bellows 70 has a flat disc-like top 72 which carries an upstanding wire connector 73 having an eye formed in its outer end, which is pivotally connected at 74 to link 75, which latter is pivotally connected at its center point 76 to the housing of valve 21. Bellows 71 has a flat disc-like top 77, to which is attached an upstanding wire connector 78, having an eye formed at the outermost end thereof, which wire is pivotally connected at 79 to link 75. A tubular fluid passageway 80 has one end connected to platform 69 and in communication with the interior of bellows 70 and its other end open to pressure within chamber 31. A similar fluid passageway 81 has one end connecting to platform 69 and its other end in communication with chamber 31, so that the fluid pressure of chamber 31 may be communicated to the interior of bellows 71.

At the outer extremity of arm 60 there is attached a pin 84, which extends outwardly from arm 60 terminating above the pivoted link 75. Link 75 carries equally spaced upstanding stops or detents 82 and 83 at different sides of the central pivot point 76. These stops are limited in height so that with link 75 horizontally extending, pin member 84 will clear the stop members 82 and 83 upon oscillation of arm 60. Stops 82 and 83 are so located on link 75, however, that with one bellows collapsed and the other expanded, the uppermost stop, 82 or 83 as the chance may be, will be directly in the path of pin 84 and will limit oscillation of the pin. Stops 82 and 83, taken with pin 84, form a latching arrangement for vane 41, the purpose of which will be set forth below.

The operation of the distributing valve above described will be readily understood from a consideration principally of Figs. 2, 4, 5, 6 and 7. When the system is at rest, no air under pressure will be entering valve 21 through the conduit 20.

When the pilot wishes to start the inflation of the rubber boots, he opens an air valve, thus permitting air, under a pressure of about 7 pounds, to flow through conduit 20 into inlet chamber 27. Considering vane 41 to be in the position shown in Fig. 4 at the beginning of operation, it will be apparent that air under pressure is deflected through the right-hand portion of chamber 31 and output conduit 22 into the tubing 24, and thence, of course, to boots 13 and 14 (see Fig. 1). Fig. 2 shows that with vane 41 at the extreme right end of its travel, bellows 70 is collapsed, whereas bellows 71 is expanded so that arm 60 is in its extreme clockwise position. Bellows 71 is expanded because of the pressure in conduit 22 to which bellows 71 is exposed through passageway 81. Bellows 70 is collapsed, because with relief valve 52 open, the pressure within conduit 23 and thus passageway 80 and bellows 70, is equal to atmospheric pressure. As the pressure of the boots 13 and 14 increases during the inflating process, that portion of vane 41 above shaft 43 will, due to the fact that the area of vane 41 above shaft 43 is much greater than the area of the vane below shaft 43, be moved to the left within chamber 31. During this motion, valve 51 is kept closed and vane 41 will continue to move toward end wall 33 until the pin member 84 touches stop member 83. This condition is illustrated in Fig. 5. During this portion of the travel of vane 41, arm 60 has moved counterclockwise and has drawn connecting rod 62 inwardly so that pin 66 lies approximately in the center of slot 64. This means, of course, that valve 52 has closed due to the tension of spring 68. Both valves 51 and 52 are now closed, and since the bottom portion of vane 41 has now cleared fillet 30 and is not yet contacting the top of fillet 29, air is being deflected into the left-hand portion of chamber 31 and is beginning to increase the pressure within tubing 25 and the boots 15 and 16 to which the tubing is connected. This results, of course, in an increase of the pressure within passageway 80 and bellows 70, so that bellows 70 begins to expand. The bottom portion of vane 41 has not yet reached the surface of fillet 29 in the position shown in Fig. 5, so that air flows from output conduit 22 as well as through throat 28 into output conduit 23, equalizing the pressure within conduits 22 and 23 and thus, within bellows 70 and 71.

As soon as the pressure in bellows 70 and 71 is equalized, of course, pin 84 clears the top of stop 83, and vane 41 completes its travel toward end wall 33 with a quick motion under the influence of spring 58. Fig. 6 shows the condition of equal pressure in bellows 70 and 71 just after pin 84 has cleared stop 83 and vane 41 has been snapped to the end of its travel by spring 58. The motion of arm 60 in moving from the position shown in Fig. 5 to that shown in Fig. 6, produces a quick opening of valve 51, which is shown open in Fig. 6.

One-half the air distributing cycle is progressively represented in Figs. 4, 5 and 6. Boots 13 and 14 have been inflated, deflated and are now under atmospheric pressure. As illustrated in Figs. 6 and 7, the air under pressure enters chamber 31 through throat 28, and is now deflected into output conduit 23 to complete the inflation of boots 15 and 16. Since valve 51 is open, the interior of bellows 71 is at atmospheric pressure and thus it collapses upon the expansion of bellows 70, which is now under the pressure existing within output conduit 23. Link 75 is thus tilted to the position shown in Fig. 7 and stop 82 is now raised, so that as pressure builds up within conduit 23, the upper portion of vane 41 will begin to move toward end wall 32 and motion of the vane at a point somewhat beyond the center position of its motion will be arrested by the engagement of pin 84 with stop 82. It is believed that an understanding of the manner in which the cycle is completed will be understood from the above discussion.

The net effect of the distribution of air by the novel valve of the present invention is that without an external driving source, such as an electric motor, air is cyclically distributed to several boots in a definite series. It makes no difference, of course, to the operation of the valve, whether one or both wing boots are simultaneously inflated. Practically, of course, each of the boots, such as 13, may consist of three or more inflatable elements. Specific boot structure is clearly brought out in the above-identified Gregg patent and other patents relating to similar ice eliminating systems.

It has been stated that the area of vane 41 above shaft 43 is much greater than the area of that part of the vane below shaft 43. It is for this reason, of course, that vane 41 may be oscillated as above described by the pressure of air and against the tension of spring 58. Without the fillet members 29 and 30, some air under pressure would be deflected to both sides of vane 41 and might therefore lessen the total force available to move vane 41 past its center point. Fillets 29 and 30 are provided so that for an appreciable initial angular motion of vane 41, no air from chamber 27 will be misdirected to the wrong side of vane 41.

The novel distributing valve described is unique in that cyclic distribution of air or other fluid is obtained directly from the flow and pressure of the fluid to be distributed, rather than from an external driving force such as an electric motor. The resultant saving in weight and space is, of course, of prime importance to the use of such a distributing valve as a control for the distribution of air in an ice eliminating system for aircraft.

Only one embodiment of the invention has been described. Other embodiments may occur to those skilled in the art, and it is intended, of course, that variations from the embodiment shown are to be included within the invention, the scope of which is to be limited not by the particular form of valve shown, but by the appended claims.

What is claimed is:

1. A distributing valve comprising a housing having an inlet chamber and a larger, sector-shaped chamber having two rigid end walls, two flat side walls and a flexible wall extending between said rigid end walls and connected to the outer extremities thereof, an outlet conduit formed between each of said rigid end walls and said inlet chamber, a vane within said housing and within said sector-shaped chamber, a shaft extending transversely of said flat side walls and journaled therein, said shaft being connected to said vane between said chambers, said vane having its outer end attached to an intermediate portion of said flexible wall and fitted within said chambers with a sliding fit, an arm member having one end fixed to said shaft exteriorly of said housing and another end extending in the plane of said vane, a coiled spring member having one end connected to said housing and another end connected to said other end of said arm member, a relief valve in each of said outlet conduits, connecting rods between said relief valves and said shaft, and means subject to movement of said vane for alternately closing one and opening the other of said relief valves.

2. A distributing valve comprising a housing including a fluid inlet chamber and a fluid distributing chamber, fluid outlet conduits opening into opposite sides of said distributing chamber, a fluid exhaust valve pivotally carried in an apertured wall of each outlet conduit, a shaft extending through said distributing chamber between said opposite walls, a vane member carried on said shaft, said vane member having a sliding fit within said distributing chamber, spring means for urging said vane toward either of said opposite walls, two flexible bellows carried externally of said housing upon a fixed base, said bellows having corresponding end walls movable under changes of fluid pressure, a link member extending between said bellows end walls, said link member having its mid-point pivoted to said housing and carrying a stop member on each side of said mid-point and spaced therefrom, an arm member fixed to said shaft, lying in the plane of said vane and extending radially from said shaft, connecting rods extending from said arm member to said fluid exhaust valves, and two fluid pressure connections, the first between one of said outlet conduits and one of said flexible bellows, the second between the other of said outlet conduits and the other of said flexible bellows, said connecting rods being so connected to said exhaust valves as to hold one of said valves in open, and the other in closed condition when said vane is at one or the other of said opposite walls, whereby, upon a predetermined fluid pressure differential existing between said outlet conduits, said vane will be oscillated through a portion of its travel within said distribution chamber until said arm is engaged by one of said detent members and one of said bellows has become flexed appreciably more than the other to move said link member to free said arm and permit said vane to complete its travel under control of said spring means and actuate said connecting rods to move one of said exhaust valves to open position.

3. A distributing valve comprising a housing containing adjacent inlet and distribution chambers, an input conduit opening into said inlet chamber, outlet conduits opening into opposite sides of said distribution chamber, a relief valve in each of said outlet conduits, a shaft extending through said distribution chamber, a vane member within said distribution chamber fixed to said shaft, a link pivotally connected to said shaft externally of said housing, detents carried by said link, means carried by said vane member for engaging with said detents, and pressure sensitive means carried by said housing for oscillating said link and freeing said detent engaging means.

4. A distributing valve comprising a housing having an inlet chamber and a distribution chamber, a shaft extending across said distribution chamber, a vane member within said distribution chamber and mounted upon said shaft, oppositely disposed outlet conduits opening into said distribution chamber, a relief valve in each of said outlet conduits, said valves being pivotally mounted in apertured portions of said conduits, spring means for biasing said vane member toward either of said outlet conduits, means operable upon oscillation of said vane member for closing one and opening the other of said relief valves, and pressure-regulated latch means for momentarily restricting the oscillation of said vane to a limited arc against the action of said spring means.

5. A distributing valve comprising a housing having adjacent input and distribution chambers, outlet conduits connected to opposite sides of said distributing chamber, a vane member pivoted for oscillation within said distribution chamber and presenting an obstruction to flow between said outlet conduits, relief valve means in each of said outlet conduits, latching means for arresting motion of said vane intermediately of its path from one to the other of said outlet conduits, and means subject to a determined pressure differential between said outlet conduits to disengage said latching means and permit said vane to complete its travel from one toward the other of said outlet conduits.

6. A distributing valve comprising a housing having adjacent input and distributing chambers, outlet conduits connected to different parts of said distributing chamber, a flow obstructing member within said distributing chamber and presenting an obstruction to flow between said outlet conduits, relief valve means in each of said outlet conduits, latching means for arresting motion of said obstructing member intermediately of its path from one to the other of said outlet conduits, and means subject to a determined pressure differential between said outlet conduits to disengage said latching means and permit said obstructing member to complete its travel from one toward the other of said outlet conduits.

WESLEY L. SMITH.